US012731500B2

(12) United States Patent
McNew

(10) Patent No.: US 12,731,500 B2
(45) Date of Patent: Sep. 8, 2026

(54) SYSTEMS AND METHODS FOR IDENTIFYING AND ADAPTING EXCITING SHOT-PATHS INVOLVING A VEHICLE

(71) Applicant: Toyota Motor Engineering & Manufacturing North America, Inc., Plano, TX (US)

(72) Inventor: John-Michael McNew, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 67 days.

(21) Appl. No.: 18/660,714

(22) Filed: May 10, 2024

(65) Prior Publication Data

US 2026/0038380 A1 Feb. 5, 2026

Related U.S. Application Data

(60) Provisional application No. 63/626,128, filed on Jan. 29, 2024.

(51) Int. Cl.
*G08G 7/00* (2006.01)
*G05D 1/689* (2024.01)
(Continued)

(52) U.S. Cl.
CPC ............... *G08G 7/00* (2013.01); *G05D 1/689* (2024.01); *G07C 5/02* (2013.01); *G05D 2109/20* (2024.01)

(58) Field of Classification Search
CPC .. G08G 7/00; G05D 1/00; G05D 1/10; G05D 1/101; G05D 1/40; G05D 1/43;
(Continued)

(56) References Cited

U.S. PATENT DOCUMENTS 9,854,165 B2 12/2017 Wang et al.
10,053,236 B1 8/2018 Buchmueller et al.
(Continued)

FOREIGN PATENT DOCUMENTS

CA 2831712 A1 * 10/2012 ............. G08G 1/205
WO 2016069497 A1 5/2016

OTHER PUBLICATIONS

Gshwindt et al., "Can a Robot Become a Movie Director? Learning Artistic Principles for Aerial Cinematography", Nov. 8, 2019 , IEEE, 2019 IEEE/RSJ IROS, pp. 1107-1114 (Year: 2019).*
(Continued)

*Primary Examiner* — Erin M Piateski
*Assistant Examiner* — Ashley Tiffany Schoech
(74) *Attorney, Agent, or Firm* — Christopher G. Darrow; Darrow Mustafa PC

(57) ABSTRACT

Systems, methods, and other embodiments described herein relate to identifying and adapting exciting shot-paths within a camera mode through acquiring data from a vehicle and an aerial device. In one embodiment, a method includes estimating an activity using context from situational data acquired about a vehicle and an environment surrounding the vehicle. The method also includes identifying shot-paths for the activity from estimated paths and viewing angles of an aerial device. The method also includes calculating excitement factors for the shot-paths using a model and selecting at least one of the shot-paths according to the excitement factors. The method also includes, on a condition that the at least one of the shot-paths satisfies feasibility conditions, adapting the shot-paths for the activity by monitoring the situational data and factoring the excitement factors.

20 Claims, 7 Drawing Sheets

(51) Int. Cl.
*G07C 5/02* (2006.01)
*G05D 109/20* (2024.01)

(58) Field of Classification Search
CPC .......... G05D 1/46; G05D 1/689; G05D 1/644; G05D 1/6445; G05D 1/69; G05D 1/692; G05D 2109/20; G07C 5/02
See application file for complete search history.

(56) References Cited

U.S. PATENT DOCUMENTS

| | | | | |
|---|---|---|---|---|
| 11,334,076 | B2 | 5/2022 | Hortner | |
| 2014/0336848 | A1 | 11/2014 | Saund et al. | |
| 2019/0225239 | A1* | 7/2019 | Sasaki | B60W 50/14 |
| 2020/0137580 | A1 | 4/2020 | Yang et al. | |
| 2021/0256255 | A1* | 8/2021 | Al Qizwini | G08G 5/32 |
| 2022/0035382 | A1 | 2/2022 | Zhou et al. | |
| 2022/0374013 | A1* | 11/2022 | Bachrach | G06V 40/23 |
| 2023/0146288 | A1* | 5/2023 | Hershkovitz | B60L 58/14 701/22 |
| 2023/0315093 | A1 | 10/2023 | Vaughn et al. | |

OTHER PUBLICATIONS

Huang et al., "ACT: An Autonomous Drone Cinematography System for Action Scenes", May 25, 2018, IEEE, 2018 IEEE ICRA, pp. 7039-7046 (Year: 2018).*
Livermore, "Optimal UAV Path Planning for Tracking a Moving Ground Vehicle With a Gimbaled Camera", Mar. 2014, Air Force Institute of Technology, pp i-106 (Year: 2014).*
Roberts, "Trajectory Optimization Methods for Drone Cameras", May 2019, Stanford University, pp i-4 (Year: 2019).*
Sabetghadam et al., "Optimal Trajectory Planning for Autonomous Drone Cinematography", 2019, IEEE, pp. 1-7 (Year: 2019).*
Sochopoulos et al., "Deep Reinforcement Learning with semi-expert distillation for autonomous UAV cinematography", 2023, IEEE, 2023 IEEE ICME, pp. 1325-1330 (Year: 2023).*
R. Bonatti et al., "Autonomous Aerial Cinematography in Unstructured Environments With Learned Artistic Decision-Making", Oct. 15, 2019, arXiv:1910.06988v1, pp. 1-49 (Year: 2019).*
Galvane et al., "Automated Cinematography with Unmanned Aerial Vehicles," arXiv: 1712.04353, Dec. 17, 2017, pp. 1-8.

* cited by examiner

SYSTEMS AND METHODS FOR IDENTIFYING AND ADAPTING EXCITING SHOT-PATHS INVOLVING A VEHICLE

This application claims the benefit of U.S. Provisional Application No. 63/626,128, filed on, Jan. 29, 2024, which is herein incorporated by reference in its entirety.

TECHNICAL FIELD

The subject matter described herein relates, in general, to capturing exciting shot-paths including a vehicle, and, more particularly, to identifying and adapting the exciting shot-paths within a camera mode using data from a vehicle and an aerial device.

BACKGROUND

Systems utilize aerial devices (e.g., drones, unmanned aerial vehicles (UAV), etc.) for various tasks involving vehicles. For example, an aerial device acquires images about an area that a vehicle processes for planning paths during automated driving. Furthermore, the vehicle can communicate with the aerial device to acquire Internet connectivity within a system in areas having sparse network coverage. As such, systems can utilize aerial devices to assist a vehicle with completing tasks and facilitating networking, thereby enhancing driving.

In various implementations, systems acquire data for a vehicle from an aerial device having images and video about a scene from various angles. However, these systems can demand manual controls, particularly to capture dramatic views and track the scene having an object (e.g., a vehicle). Aerial devices capturing the dramatic views also encounter difficulties tracking and adapting as the object moves within an environment from an initial angle and position. Furthermore, an aerial device recording camera views that are live with acquired image data around an object can lack creativity without factoring in environmental characteristics. Therefore, systems generating vehicle footage with data from aerial devices can be devoid of cinematographic and artistic qualities, thereby decreasing operator satisfaction.

SUMMARY

In one embodiment, example systems and methods relate to identifying and adapting exciting shot-paths within a camera mode through acquiring data from a vehicle and an aerial device. In various implementations, systems generating vehicle footage using data from a vehicle and an aerial device can lack cinematographic features and uniqueness about the current activity (e.g., off-road driving). For instance, systems capturing footage of a vehicle driving off-road from a rear and elevated view exhibit lesser viewing excitement than a closer and angled view. Similarly, when the environment is a steep slope and an off-road activity is a vehicle accelerating down the steep slope, a shot from an aerial device in front, centered on the vehicle grill, and looking up the steep slope is exciting since the shot emphasizes the steepness. However, a shot of the drone flying above with a top-down view of the vehicle is less exciting as the shot de-emphasizes the steepness. Furthermore, systems changing paths of the aerial device with vehicle motion can demand manual inputs that dampen viewer satisfaction. Thus, systems controlling aerial devices to capture exciting views of a vehicle encounter difficulties identifying compelling shots and changing paths, thereby decreasing viewing pleasure.

Therefore, in one embodiment, a tracking system has a camera mode within a vehicle (e.g., "cinematographer mode") that automatically generates footage using data acquired from an aerial device that is exciting. In particular, the tracking system acquires vehicle images and video using a camera mounted on an aerial device (e.g., a drone, an unmanned aerial vehicle (UAV), etc.). Upon selecting the camera mode, the tracking system automatically instructs the aerial device to autonomously fly and capture the vehicle images and video along a shot-path that is exciting and feasible (e.g., a shot-path that is safe). Here, the shot-path can be a timed sequence of maneuvers by the aerial device and related changes to camera variables (e.g., gimbal, zoom degree, filters, etc.). The tracking system may select the shot-path according to an activity estimated for the vehicle and excitement factors. The activity can be a vehicle state that includes data about the aerial device, a vehicle environment, vehicle data, etc. An excitement factor may be a raw score formulated with changing camera angles, flying paths, degrees of freedom (DoF), least cost, view confidence, etc. In one approach, the tracking system follows a shot-path for a certain time period until the excitement factor decays and automatically selects another shot-path previously identified for the activity as exciting. Therefore, the tracking system controls the aerial device from the vehicle to capture cinematographic styles exhibiting exciting shots and views of the vehicle through identifying and adapting shot-paths for an estimated activity, thereby enhancing viewing pleasure.

In one embodiment, a tracking system for identifying and adapting exciting shot-paths within a camera mode through acquiring data from a vehicle and an aerial device is disclosed. The tracking system includes a memory including instructions that, when executed by a processor, cause the processor to estimate an activity using context from situational data acquired about a vehicle and an environment surrounding the vehicle. The instructions also include instructions to identify shot-paths for the activity from estimated paths and viewing angles of an aerial device. The instructions also include instructions to calculate excitement factors for the shot-paths using a model and selecting at least one of the shot-paths according to the excitement factors. The instructions also include instructions, on a condition that the at least one of the shot-paths satisfies feasibility conditions, to adapt the shot-paths for the activity by monitoring the situational data and factoring the excitement factors.

In one embodiment, a non-transitory computer-readable medium for identifying and adapting exciting shot-paths within a camera mode through acquiring data from a vehicle and an aerial device and including instructions that when executed by a processor cause the processor to perform one or more functions is disclosed. The instructions include instructions to estimate an activity using context from situational data acquired about a vehicle and an environment surrounding the vehicle. The instructions also include instructions to identify shot-paths for the activity from estimated paths and viewing angles of an aerial device. The instructions also include instructions to calculate excitement factors for the shot-paths using a model and selecting at least one of the shot-paths according to the excitement factors. The instructions also include instructions, on a condition that the at least one of the shot-paths satisfies feasibility conditions, to adapt the shot-paths for the activity by monitoring the situational data and factoring the excitement factors.

In one embodiment, a method for identifying and adapting exciting shot-paths within a camera mode through acquiring data from a vehicle and an aerial device is disclosed. In one embodiment, the method includes estimating an activity using context from situational data acquired about a vehicle and an environment surrounding the vehicle. The method also includes, identifying shot-paths for the activity from estimated paths and viewing angles of an aerial device. The method also includes, calculating excitement factors for the shot-paths using a model and selecting at least one of the shot-paths according to the excitement factors. The method also includes, on a condition that the at least one of the shot-paths satisfies feasibility conditions, adapting the shot-paths for the activity by monitoring the situational data and factoring the excitement factors.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
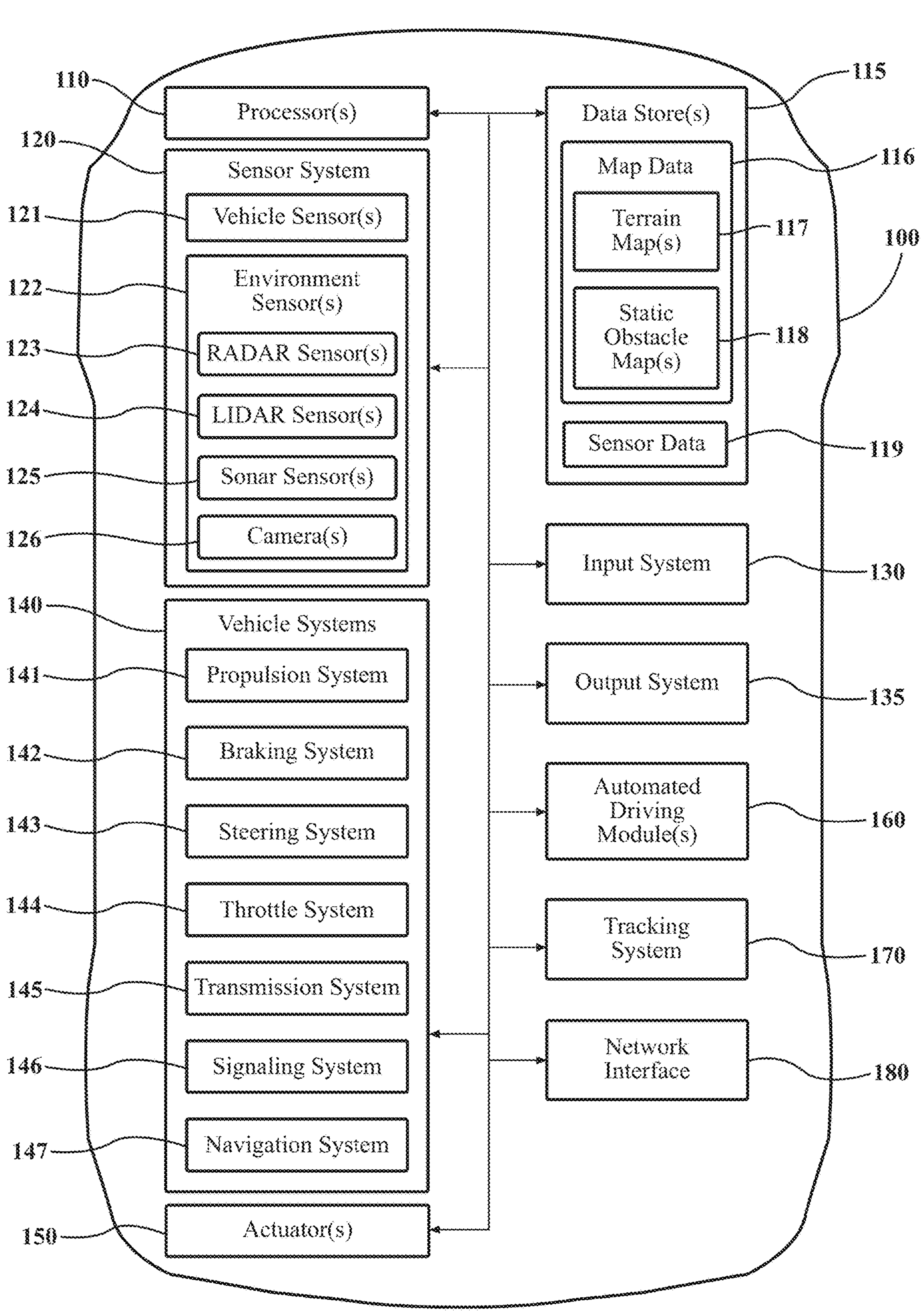
FIG. 1 illustrates one embodiment of a vehicle within which systems and methods disclosed herein may be implemented.

Systems, methods, and other embodiments associated with identifying and adapting exciting shot-paths within a camera mode through acquiring data from a vehicle and an aerial device are disclosed herein. In various implementations, systems utilizing aerial devices to record a vehicle for entertainment purposes encounter difficulties with identifying and capturing exciting shot-paths. Here, a shot-path can be a timed sequence of maneuvers by the aerial device and related changes to camera variables (e.g., gimbal, zoom degree, filters, etc.). These systems also face challenges adapting shot-paths as the vehicle moves. Regarding mis-identifying exciting shot-paths, as an example, systems capture a birds-eye view of a tire during drifting that lacks cinematographic qualities and excitement as compared to low-flying shots including the tire. As another example, a top-down view rather than a birds-eye view of the vehicle can be exciting through emphasizing a pattern of dust trails during drifting in a flat desert. Furthermore, systems precisely tracking the vehicle sometimes demand manual inputs and feedback, thereby distracting vehicle occupants (e.g., passengers, operators, drivers, etc.) from other tasks. Thus, systems generating vehicle footage from data captured by an aerial device can be devoid of shot-paths acquiring exciting views and demand manual controls that hamper user enjoyment.

Therefore, in one embodiment, a tracking system estimates an activity for a vehicle having exciting qualities and identifies shot-paths for an aerial device (e.g., a drone, an unmanned aerial vehicle (UAV), etc.) to capture the activity. Here, the tracking system can estimate the activity using context (e.g., driving uphill) from situational data acquired about the vehicle and a surrounding environment from the aerial device and vehicle sensors. In one approach, the tracking system identifies the shot-paths for the activity from estimated paths and viewing angles of an aerial device. This task can involve finding available and feasible shot-paths by factoring safety for the aerial device, view obstructions, and a relative motion between the vehicle and the aerial device. Upon identifying shot-paths that are available and feasible, the tracking system can compute excitement factors using a model (e.g., a data-driven model, an expert-based model, etc.) and selects a shot-path by factoring the excitement factors. In this case, an excitement factor can be a raw score (e.g., 1-10) derived from an excitement function that factors changing camera angles, flying paths, degrees of freedom (DoF), vehicle views, view confidence, etc. Furthermore, the tracking system can optimize excitement factors by ranking, such as using expert-ratings of the shot-paths for cinematographic qualities. As such, the tracking system efficiently and accurately identifies exciting shot-paths that are safe and feasible through calculating excitement factors.

In various implementations, the aerial device automatically deploys and autonomously flies along the selected shot-path upon receiving instructions from the tracking system and the vehicle. Furthermore, the tracking system adapts the shot-path while the activity remains by monitoring the situational data (e.g., vehicle data, aerial device data, etc.) and changes with the excitement factors. In one approach, the tracking system recalculates the excitement factors for the shot-paths that are feasible and selects a different shot-path when the initial shot-path is no longer feasible (e.g., safety) or exciting, such as from excitement decay (e.g., an extended shot). Accordingly, the tracking system generates vehicle footage using image data from an aerial device through identifying and grading exciting shot-paths and maintains excitement values by adapting and changing shot-paths, thereby optimizing excitement and increasing entertainment for the vehicle footage.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, a tracking system 170 uses road-side units (RSU), consumer electronics (CE), mobile devices, robots, drones, and so on that benefit from the functionality discussed herein associated with identifying and adapting exciting shot-paths within a camera mode through acquiring vehicle and aerial data. In the examples given, a shot-path may be a timed sequence of maneuvers associated with an aerial device and changes according to camera variables (e.g., gimbal, roll, pitch, yaw, physical zoom, digital zoom, filters, etc.). The maneuver can include positions, pose, velocity, roll, pitch, yaw, etc., of the aerial device and factor trajectories (e.g., planned, predicted, etc.) of the vehicle 100 being tracked. A shot-path can also be relative to movement by the vehicle 100 (e.g., a tracking shot) or a fixed feature (e.g., a hill for catching air, etc.).

Additionally, the vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, as discussed, one or more components of the disclosed system can be implemented within the vehicle 100 while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes the tracking system 170 that is implemented to perform methods and other functions as disclosed herein relating to identifying and adapting exciting shot-paths within a camera mode through acquiring data from the vehicle 100 and an aerial device. As will be discussed in greater detail subsequently, the tracking system 170, in various embodiments, is implemented partially within the vehicle 100, and remotely, such as a cloud-based service. For example, in one approach, functionality associated with at least one module of the tracking system 170 is implemented within the vehicle 100 while further functionality is implemented within a cloud-based computing system.

Figure 2:
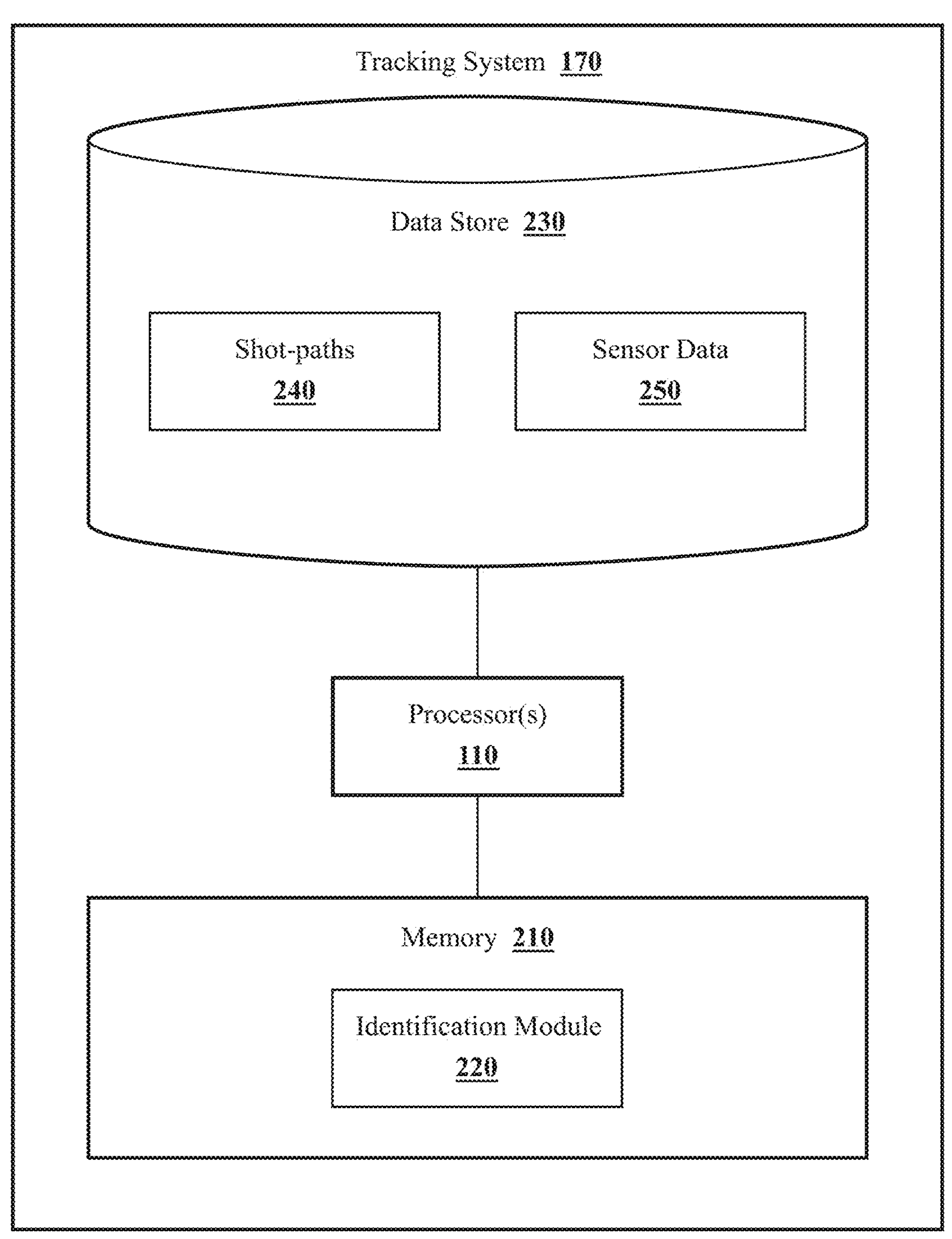
FIG. 2 illustrates one embodiment of a tracking system that is associated with identifying shot-paths and adapting the exciting shot-paths for a vehicle activity.

With reference to FIG. 2, one embodiment of the tracking system 170 of FIG. 1 is further illustrated. The tracking system 170 is shown as including a processor(s) 110 from the vehicle 100 of FIG. 1. Accordingly, the processor(s) 110 may be a part of the tracking system 170, the tracking system 170 may include a separate processor from the processor(s) 110 of the vehicle 100, or the tracking system 170 may access the processor(s) 110 through a data bus or another communication path. In one embodiment, the tracking system 170 includes a memory 210 that stores an identification module 220. The memory 210 is a random-access memory (RAM), a read-only memory (ROM), a hard-disk drive, a flash memory, or other suitable memory for storing the identification module 220. The identification module 220 is, for example, computer-readable instructions that when executed by the processor(s) 110 cause the processor(s) 110 to perform the various functions disclosed herein. Furthermore, the tracking system 170 as illustrated in FIG. 2 is generally an abstracted form of the tracking system 170 having instructions for identifying and adapting exciting shot-paths within a camera mode through acquiring data from a vehicle and an aerial device.

With reference to FIG. 2, the identification module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the tracking system 170 and the identification module 220, in one embodiment, acquire sensor data 250 that includes at least camera images and video (e.g., footage), such as images and video acquired from an aerial device through the network interface 180. In further arrangements, the identification module 220 acquires the sensor data 250 from further sensors such as radar sensors 123, LIDAR sensors 124, and other sensors as may be suitable for identifying vehicles and locations of the vehicles.

Accordingly, the identification module 220, in one embodiment, controls the respective sensors to provide the data inputs in the form of the sensor data 250. Additionally, while the identification module 220 is discussed as controlling the various sensors to provide the sensor data 250, in one or more embodiments, the identification module 220 can employ other techniques to acquire the sensor data 250 that are either active or passive. For example, the identification module 220 may passively sniff the sensor data 250 from a stream of electronic information provided by the various sensors to further components within the vehicle 100. Moreover, the tracking system 170 and the identification module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

Moreover, in one embodiment, the tracking system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the identification module 220 in executing various functions. In one embodiment, the data store 230 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on. In one embodiment, the data store 230 further includes the shot-paths 240 that may be feasible, infeasible, exciting, etc. As previously explained, the shot-paths 240 can be timed sequences of maneuvers by an aerial device related to the vehicle 100 and associated changes to camera variables (e.g., gimbal, zoom degree, filters, etc.).

In one approach, the tracking system 170 uses a data-driven model for identifying and adapting exciting shot-paths within a camera mode through acquiring data from the vehicle 100 and an aerial device. For instance, the data-driven model is a machine learning algorithm, such as a convolutional neural network (CNN), to perform semantic segmentation over the sensor data 250 from which further information is derived. Of course, in further aspects, the tracking system 170 may employ different machine learning algorithms or implement different approaches for performing the associated functions, which can include deep convolutional encoder-decoder architectures, or another suitable approach that generates semantic labels for the separate object classes represented in the image. Whichever particular approach the tracking system 170 implements, the tracking system 170 provides an output with semantic labels identifying objects represented in the sensor data 250. In this way, as further explained below, the tracking system 170 can effectively calculate excitement factors for shot paths using the data-driven model and select a shot path(s) using excitement factors that are optimized, such as through scoring.

Figure 3:
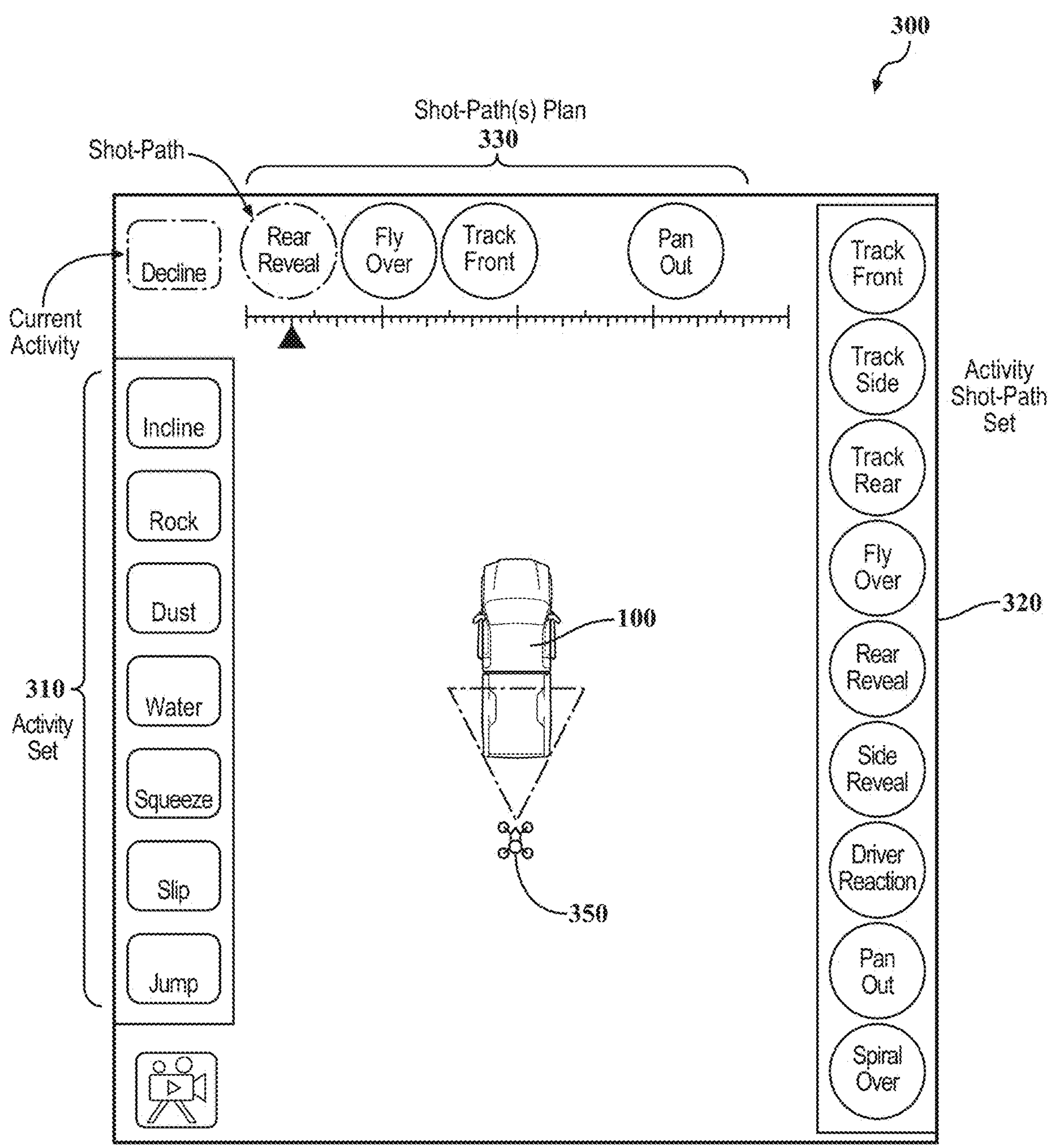
FIG. 3 illustrates one embodiment of a user interface that allows control of vehicle footage that is exciting through the tracking system.

Now turning to FIG. 3, one embodiment of a user interface (UI) 300 that allows control of vehicle footage that is exciting through the tracking system 170 is illustrated. The UI 300 may include an activity set 310, an activity shot-path set 320, and a shot-path(s) plan 330 for creating exciting and dramatic images (e.g., a video, a movie, etc.) about the vehicle 100. In one approach, the activity set 310 includes off-road activities recognized by the tracking system 170, such as incline, rock, dust, water, squeeze, slip, jump, etc. However, the vehicle 100 can also engage in other activities that are exciting and entertaining to viewers. The activity shot-path set 320 can be shot-paths associated with capturing quality images for a particular activity, such as track front, track side, track rear, fly over, rear reveal, side reveal, driver reaction, pan out, spiral over, etc. Furthermore, the shot-path(s) plan 330 can be generated by the tracking system 170 as a plan having one or more shot-paths, such as rear reveal, fly over, track front, pan out, etc., that have elevated excitement qualities.

For a richer experience, the UI 300 displays the current activity, a shot-path(s), an upcoming sequence of shot-paths, etc., within a view that may be unified for enhancing interactivity. Furthermore, the UI 300 can display the location of an aerial device 350 (e.g., a drone, a UAV, etc.) relative to the vehicle 100 through an explorer map, a GPS map, etc. In various implementations, the tracking system 170 includes instructions that cause the processor 110 to estimate the current activity using context from situational data acquired about the vehicle 100 and an environment surrounding the vehicle 100. In this way, the tracking system 170 can control the aerial device 350 through the network interface 180 to automatically capture exciting angles and views in the environment that are appropriate for the activity. For example, an operator selects a single "cinematography mode" button on the UI 300 that is displayed on a vehicle monitor, a mobile device, etc. The selection automatically initiates auto-deployment of the aerial device 350 equipped with a vehicle camera.

After the selection, the tracking system 170 estimates the context for a situation using vehicle data from the sensor system 120 and the sensor data 250. The context can factor one of the activities, capabilities, operating information, environmental conditions, landscape, terrain, weather, sunlight, overcast, etc. The context can also factor surrounding landmarks and other background data (e.g., mountains, bodies of water, trees, etc.), as well as nearby objects (e.g., other vehicles, trees, power lines, tunnels, bridges, etc.) that may impact camera angles. In one approach, the tracking system 170 selects the activity from a set of activities according to a vehicle trajectory and speed as the context when these factors are significant over others.

Regarding interactivity details, in another example the UI 300 displays the vehicle 100 and the aerial device 350 in three-dimensions (3D) for viewing a shot-path optimally. An operator can also slide, manipulate, etc., information on the UI 300 for showing upcoming shots that are sequential as additional functionality. Furthermore, the UI 300 can allow the operator to override a current activity, a current shot-path, an activity, and a shot-path plan manually. For instance, the operator drags and drops icons from the activity set 310 or activity shot-path set on the UI 300 for an override or manual control. In response, the tracking system 170 automatically searches and estimates another activity, switches a shot-path, etc., such as using context and environmental information about the vehicle 100. As such, the tracking system 170 improves viewing pleasure by allowing direct control that enhances excitement without added complexity.

Moreover, the tracking system 170 can predict a current activity from the activity set 310. For example, the tracking system 170 automatically predicts the current path and trajectory of the vehicle 100 and estimates the current activity (e.g., off-roading, rock climbing, drifting, etc.) accordingly. Computations for the current activity may factor vehicle speed, wheel slip, traction control settings, global positioning system (GPS) information, map data, inertial measurement unit (IMU) data, etc. Other factors can include data from the aerial device 350, dust estimators, predicted dust, incline estimators, etc. As such, an off-road activity involves rock climbing (e.g., rock icon), accelerated driving on sand or dust (e.g., dust icon), an incline maneuver, a decline maneuver, etc.

In one embodiment, the tracking system 170 identifies an off-road activity using one of data from the sensor system 120, GPS information, map data, sensor data from the aerial device 350, operator inputs, etc. As such, the identification module 220 can identify shot-paths for the activity from estimated paths and viewing angles for the aerial device 350 by factoring the context, the sensor data 250 about the vehicle 100, and data acquired from the aerial device 350. Furthermore, the identification may include determining available, feasible, infeasible, safe, etc., flying paths for the aerial device 350, thereby preventing damage and avoiding accidents.

Regarding more on feasibility, the tracking system 170 computes iteratively camera angles and positions that are possible along available flying paths for the aerial device 350, thereby automatically identifying feasible shot-paths (e.g., camera views). For example, a shot-path is feasible if an analysis satisfies parameters and conditions indicating that the flight path is safe for the aerial device 350, the vehicle motion relative to the flight path is exciting, the viewing is unobstructed (e.g., dust-free, lacking trees, etc.), and so on. In other words, the tracking system 170 can compute shot-path availability using context through factoring vehicle safety, aerial device safety, view obstructions, and a relative motion between the vehicle 100 and the aerial device 350.

Regarding additional details, the tracking system 170 automatically calculates excitement factors for shot-paths using a model and selects a shot-path(s) using excitement factors. In particular, an excitement factor may be a raw score formulated with changing camera angles, flying paths, DoF, vehicle views, shortest path, least cost, view confidence, etc. A shot-path can have an excitement factor that varies according to an excitement function that outputs a value (e.g., 1-10) associated with input quantities. In one approach, the model generates excitement factors according to expert ratings of shot-paths (i.e., an expert-based model). For example, the model relates excitement ratings for an activity to a corresponding environment. Here, experts rate positions, angles, flying paths, plans, etc., through measuring and grading cinematographic qualities. These qualities can be one of an ideal, most exciting, compelling, etc., location and plan associated with an estimated activity by the tracking system 170. For instance, a shot-path near a front tire of the vehicle 100 has an elevated activity excitement (e.g., eight) when the vehicle 100 is climbing a rocky area for an activity. On the contrary, a shot-path 100 meters (m) above the vehicle 100 has a depressed excitement (e.g., one) for this activity involving the front tire.

For modeling, in another embodiment, a data-driven model learns from data such as an operator profile, operator habits (e.g., activity overrides, shot-path overrides, etc.), fleet data, etc., and outputs excitement factors. As such, the tracking system 170 can rank the excitement of shot-paths by learning preferences acquired about vehicle occupants (e.g., passengers, operators, drivers, etc.). For example, the tracking system 170 learns positions, plans, etc., that the vehicle occupants previously selected for the aerial device 350 while performing a particular activity. In particular, an operator may repeatedly override a chosen shot-path A during an activity 1 and instead select shot-path B. Here, the data-driven model learns that for this operator and activity that shot-path B is more exciting than shot-path A and adjusts weights, hyperparameters, etc., accordingly. When similar overrides are seen fleet-wide, the tracking system 170 can also update a base model for improving performance and accuracy of multiple vehicles. As such, frequently used positions have correlations with occupant preferences that are most exciting and thus have elevated excitement ratings. In this way, the tracking system 170 automatically controls the aerial device 350 to move using a learned position and fly following a plan when the vehicle 100 is performing a similar activity in the future during the camera mode (e.g., cinematographer mode). On the contrary, when an occupant seldom selects a shot-path, angle, position, etc., during a certain activity by the aerial device 350, the tracking system 170 trains the model to learn that the occupant finds the shot-path and related view (e.g., shot angle, position of the aerial device, etc.) lacking necessary excitement. Accordingly, the model will rank this shot-path lower.

Figure 4:
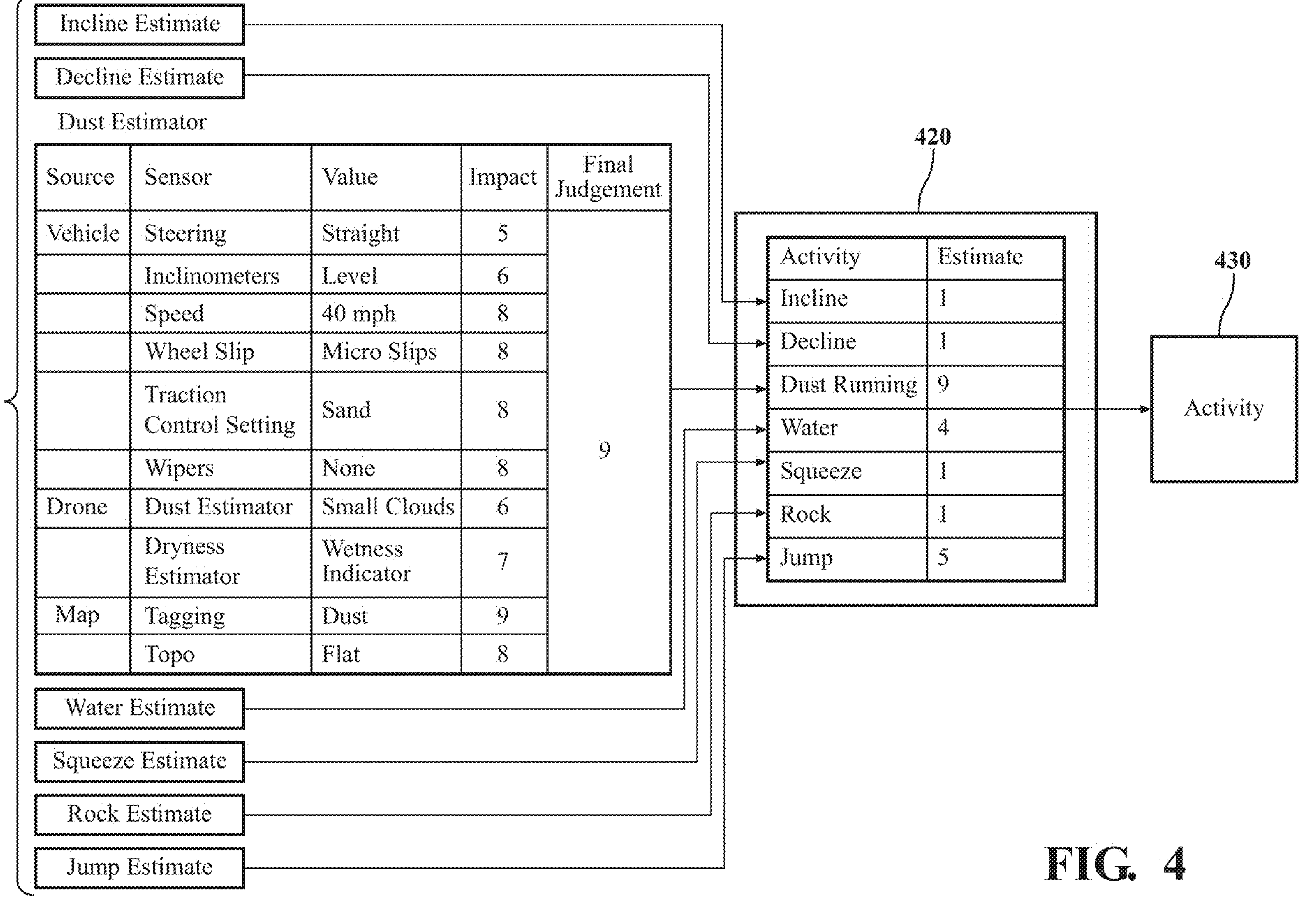
FIG. 4 illustrates one embodiment of an activity estimator that automatically detects an activity of the vehicle for image capture by the tracking system.

Referring to FIG. 4, one embodiment of an activity estimator that automatically detects an activity of the vehicle 100 for image capture by the tracking system 170 is illustrated. Here, the tracking system 170 can estimate parameters relating to multiple events and activities 410, such as an incline estimate, a decline estimate, a dust estimate, dust predictions, a water estimate, a squeeze estimate, a rock estimate, a jump estimate, etc. For instance, the dust estimator processes sensor data from the vehicle 100, the aerial device 350 (e.g., a drone), and the map data 116 for scoring according to impact. Subsequently, the tracking system 170 can sum, weigh, etc., the impact scores and generate a value associated with a final judgment for dust conditions (e.g., 9).

The activity estimator 420 receives the multiple events and activities 410 that are estimates and situational data as inputs for further processing. For instance, the activity estimator 420 outputs the activity 430 as a prediction according to the multiple events and activities 410. In one approach, an activity estimation includes weighing and scoring excitement factors that are calculated. For example, the tracking system 170 ranks shot-paths according to excitement factors. The rank can factor occupant preferences for the activity, such as occupant ratings for different views, different angles, flight plans for the activity, manual selections of a shot-path, etc., received through the UI 300. As such, an initial selection, recommendation, etc., by the activity estimator 420 is the shot-path having the excitement factor with the greatest ranking and grading for a current situation, thereby representing the most exciting views presently available.

As further explained below, the tracking system 170 may continuously and automatically monitor situational data while the aerial device 350 is in flight until returning to the vehicle 100. The monitoring can represent assessing in real-time the changing activities, trajectories, flight paths, and camera angles to reevaluate available shot-paths, accordingly. However, in one embodiment, excitement factors remain fixed during flight upon selecting an initial cinematography style. In this case, the excitement factors may change upon an initial shot-path becoming unavailable, a shot-path becoming irrelevant, an activity ending, selecting a new mode, etc. As such, the tracking system 170 recalculates excitement factors during available opportunities, such as when the aerial device 350 is in a standby mode, following an initial setup, etc.

Figure 5:
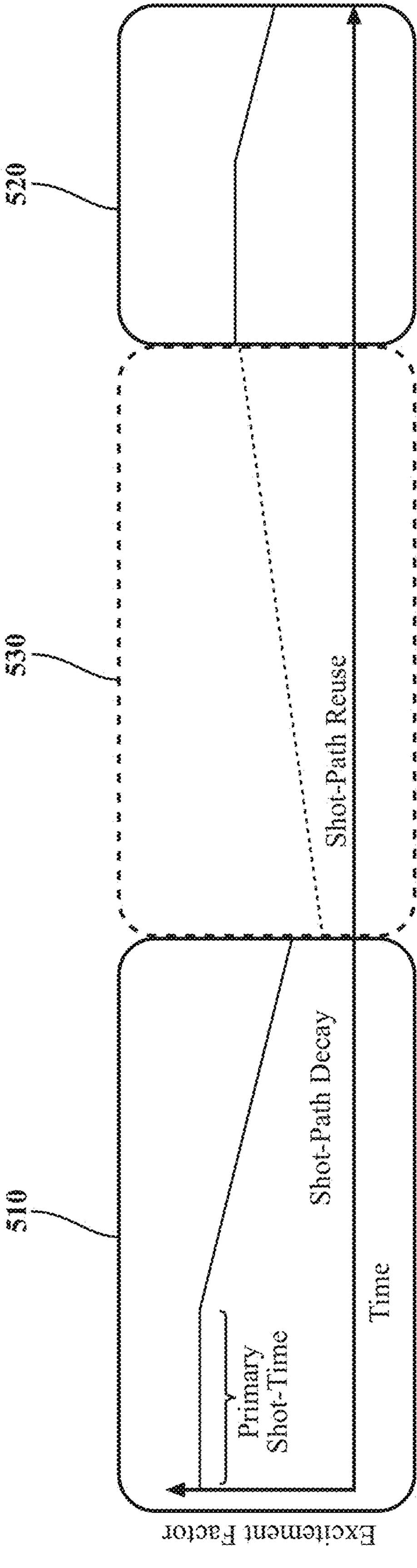
FIG. 5 illustrates an example of an excitement factor associated with an activity changing over time.

Now turning to FIG. 5, an example of an excitement factor associated with an activity changing over time is illustrated. The tracking system 170, in one embodiment, factors timing when developing and planning exciting shot-paths for execution with the aerial device 350. As explained herein, the tracking system 170 can adapt shot-paths that satisfy feasibility conditions for the activity by monitoring situational data and factoring changes among excitement factors. For example, the tracking system 170 first identifies shot-path 510 having an excitement rate and excitement factor that are substantial during a primary shot-time and the aerial device 350 follows the shot-path 510. The tracking system 170 subsequently commands the aerial device 350 through the network interface 180 to reposition after a time period when satisfying a threshold. Here, the threshold may represent a time point where the exciting path ceases being the most exciting through decay. A shot-path can experience a decaying and declining excitement factor since an occupant may lose interest in viewing the same shot, angle, etc., for a substantial and extended time.

In various implementations, the threshold can be preset by an occupant, factor expert inputs, etc. As such, the tracking system 170 can readjust the aerial device 350 after the time period (e.g., five minutes) to ensure that excitement is kept elevated for viewers. At this point, the tracking system 170 may control the aerial device 350 and move to the next-most exciting position, such as through factoring occupant feedback, expert feedback, excitement factors, etc. In one approach, the shot-path unsatisfies feasibility conditions from the decay that triggers the tracking system 170 to recalculate the excitement factors for the shot-paths using a model and selecting a different shot-path. In this way, the tracking system 170 maintains exciting shot-paths for vehicle footage through adaptive processing.

The tracking system 170 can implement a subsequent shot-path 520 that is similar to the shot-path 510 after an elapsed time of the shot-path reuse 530. Here, the tracking system 170 calculates that a previously used shot-path is once again exciting and optimal. In other words, previously used shot-paths can become relevant again in the subsequent shot-path 520 for the same activity. Relevance is regained by rebuilding the excitement factor to (0, Y) that was initially associated with the shot-path 510. Accordingly, the tracking system 170 then reuses the shot-path 510 after a certain time period.

In FIG. 5, the location and environment of the vehicle 100 may affect the excitement factor of the shot-path 510. In one approach, some activities and shot-paths are spatially constrained. For instance, the shot-path 510 involving a hill where the vehicle 100 will take air is valid at locations where the vehicle 100 is jumping. The excitement factor for the shot-path 510 is downgraded at other locations. Furthermore, the speed and position of the vehicle 100 can also affect the excitement factor for the shot-path 510. For example, catching air at the hill can change (e.g., increase, decrease, etc.) an excitement factor with speeds of the vehicle 100 and projected air time for the speeds. As another example, an environmental input like water depth can change (e.g., increase, decrease, etc.) the excitement factor for the shot-path 510 when capturing a water splash.

Figure 6:
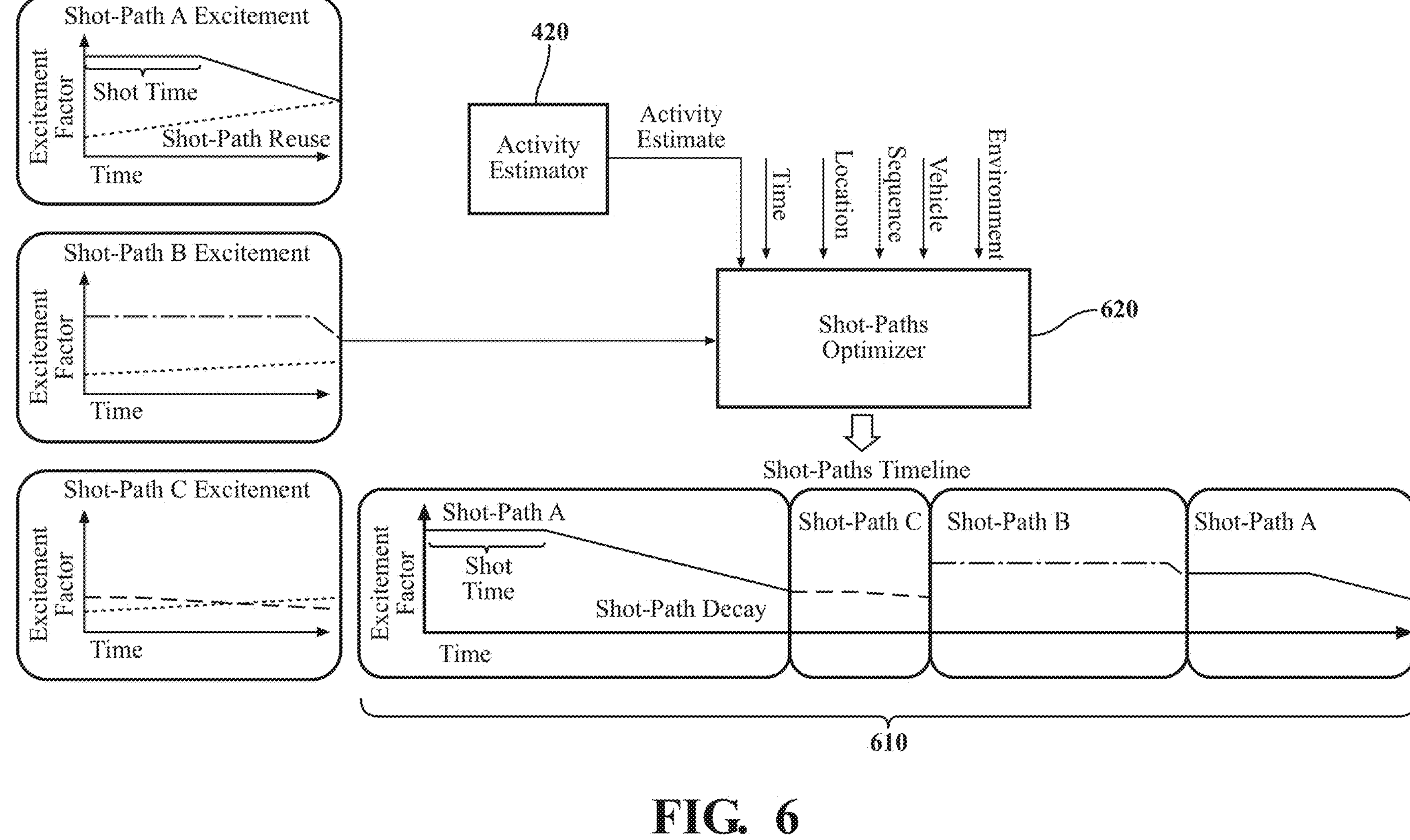
FIG. 6 illustrates an embodiment of the tracking system identifying shot-paths from estimated paths and viewing angles using an aerial device and generating a timeline for the shot-paths.

Referring to FIG. 6, an embodiment of the tracking system 170 identifying shot-paths from estimated paths and viewing angles using the aerial device 350 and automatically generating a timeline for shot-paths is illustrated. In particular, the tracking system 170 can assemble a timeline for the vehicle 100 having a sequence of shot-paths according to the excitement factors. Furthermore, the timeline can be optimized according to decay and reuse factors associated with the shot-paths that maximize the excitement factors for the activity.

Regarding more details about FIG. 6, the excitement factor varies within a shot-path sequence represented through a shot-paths timeline 610 among other shot-paths. In one approach, shot-paths A-C have excitement factors that vary and decay according to respective excitement functions and reuse parameters. The tracking system 170 triggers the shot-paths optimizer 620 to analyze the activity estimate received from the activity estimator 420 and generate the shot-path sequence that maximizes excitement factors. The optimization can include factoring feasible and safe shot-paths. The analysis may output that a shot-path capturing the vehicle 100 experiencing a sudden decline followed directly by a shot-path capturing an operator reaction boosting the excitement factor for shot-paths A and B. This analysis by the tracking system 170 suggests sequencing shot-paths A and B within a timeline. Shot-path sequencing can also add excitement by reducing filler motion (e.g., a frontal shot) between shot-paths. Filler motion can involve connecting shot-paths where a shot-path endpoint is far from a start-point of a subsequent shot-path in a sequence. As such, the tracking system 170 will choose as a connecting shot-path one having the highest excitement factor logically connecting the endpoint to the start-point. In this way, the tracking system 170 reduces occurrences of non-exciting filler motion between the endpoint to the start-point. As another enhancement, excitement functions for shot-paths A-C output increased excitement factors according to sequencing statistics (e.g., shot-paths per minute that are unique).

In FIG. 6, constructing the shot-paths timeline 610 automatically with the vehicle 100 and the tracking system 170 can involve the shot-paths optimizer 620 aligning excitement factors over the inputs. Here, the inputs can include the activity estimate, time, a location, a sequence, a vehicle, an environment, etc. In various implementations, the shot-paths optimizer 620 also factors the inputs being constrained by shot-path feasibility that can depress an excitement factor. Regarding details about the inputs, in one approach, the activity estimate represents an exciting activity (e.g., off-road driving) estimated by the tracking system 170 from acquired data and a related excitement factor. As such, a shot-path of a close-up view involving a front tire during rock climbing will have a greater excitement factor than a different shot-path above the vehicle 100. In this case, the excitement factor and other inputs can augment, increase, decrease, etc., the activity estimate.

The time input can represent a minimum time for a shot. For example, the shot time is 0 if the shot cannot be maintained for a specified time while factoring an activity type and an augmentation factor(s) (e.g., excitement). In one approach, the time input is a time-dependent value that varies according to an estimated activity, identified shot-path, etc. Other time inputs include a decay duration, decay parameters, decay rates, reuse parameters, etc., associated with a shot-path and excitement factors. As such, the time input assists the tracking system 170 with switching between shot-paths according to decay over time (e.g., a downward slope). Regarding reuse, the tracking system 170 can utilize reuse parameters to control a period between reusing a shot-path. As illustrated by the shot-path reuse 530, the excitement factor may exhibit an increasing slope for a reuse chart. Accordingly, the tracking system 170 utilizes time inputs such as decay and reuse to generate the shot-paths timeline 610 that is optimized for excitement.

Moreover, the location and environment inputs may specify spatial constraints for activities and shot-paths. For instance, a shot-path from a hill side where the vehicle 100 will take a 180-degree turn that is sharp can be valid at a location of the hill having needed space for maneuvering. The tracking system 170 otherwise downgrades the excitement factor in other locations on the hill. The environmental input can include information such as water depth. For example, the excitement factor for a shot-path capturing a splash varies as water depth changes (e.g., increases, decreases, etc.). In other words, an elevated water depth is associated with a greater excitement factor from the vehicle 100 encountering a substantial splash.

Now discussing details of other inputs, the vehicle input includes other parameters that impact excitement. For example, a shot-path catching air at a hill can change (e.g., increase, decrease, etc.) according to a vehicle speed and projected hang time the vehicle 100 experiences at that speed. The sequence input can indicate that the excitement factor for a shot-path will change (increase, decrease, etc.) according to a sequence position. As previously explained in FIG. 5, for example, a shot-path capturing the vehicle 100 experiencing a sudden decline followed directly by a shot-path capturing an operator reaction boosts the excitement factor within the shot-paths timeline 610. Additionally, sequencing can also add excitement by reducing filler motion (e.g., a frontal shot) between shot-paths.

Still referencing FIG. 6, the shot-paths optimizer 620 can output the shot-paths timeline 610 of shot-path A sequentially followed by shot-paths C and B for an estimated activity (e.g., cross-country racing). While the aerial device 350 follows the shot-paths timeline 610, the reuse factor for shot-path A increases over time while excitement factors for shot-paths C and B decay. As such, the shot-paths timeline 610 includes the aerial device 350 returning to shot-path A for the estimated activity.

Figure 7:
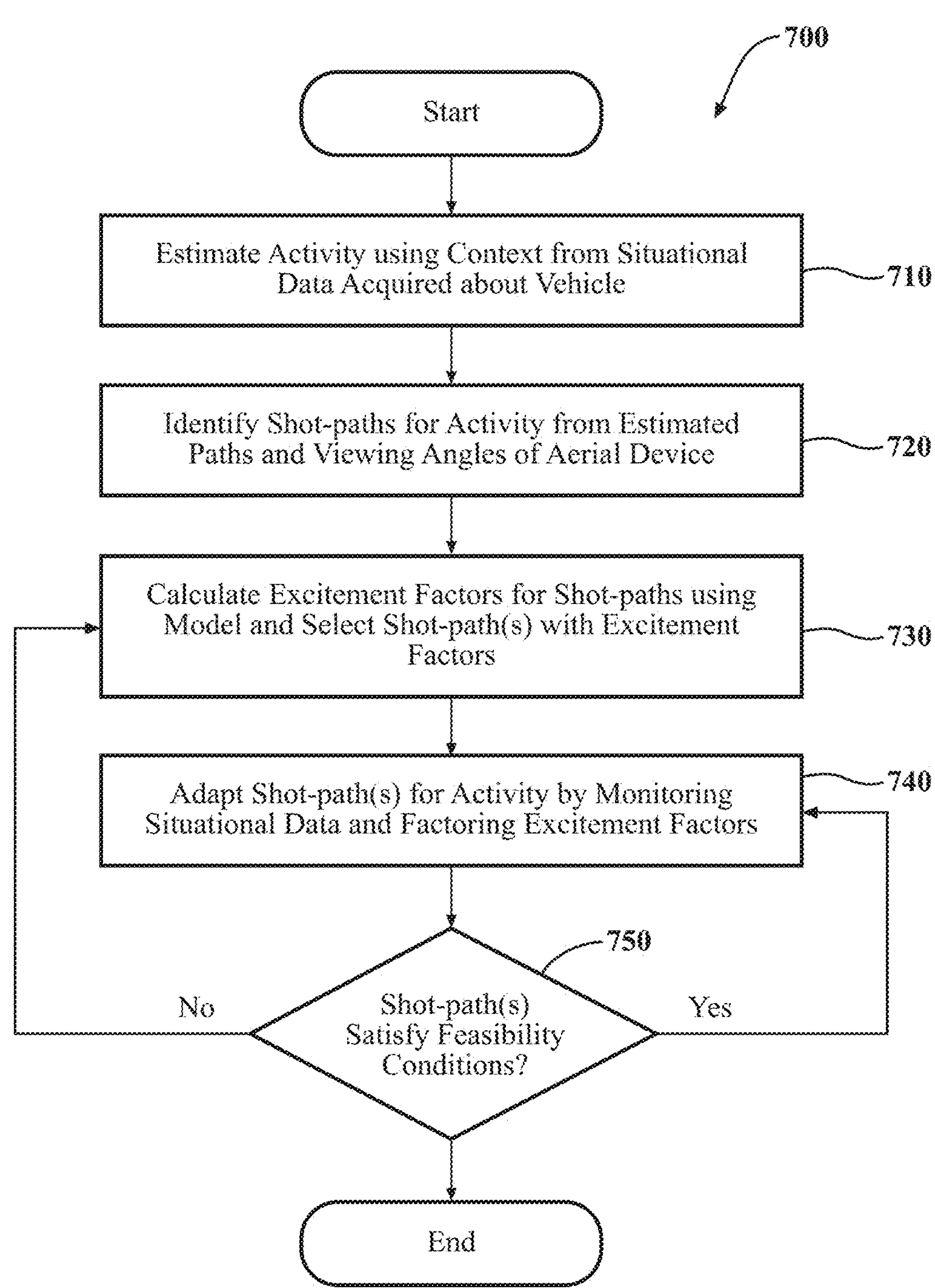
FIG. 7 illustrates one embodiment of a method that is associated with identifying shot-paths having cinematographic qualities and adapting the shot-paths for an estimated activity.

Now turning to FIG. 7, a flowchart of a method 700 that is associated with identifying shot-paths having cinematographic qualities and adapting the shot-paths for an estimated activity is illustrated. Method 700 will be discussed from the perspective of the tracking system 170 of FIGS. 1 and 2. While method 700 is discussed in combination with the tracking system 170, it should be appreciated that the method 700 is not limited to being implemented within the tracking system 170 but is instead one example of a system that may implement the method 700.

At 710, the tracking system 170 estimates an activity using a context derived from situational data acquired about the vehicle 100. The context can also include information about an environment surrounding the vehicle 100. The activity can be off-roading, rock climbing, drifting, etc. As previously explained, the tracking system 170 can predict an activity involving the vehicle 100 automatically through factoring the current path and trajectory of the vehicle 100. Other factors can include vehicle speed, wheel slip, traction control settings, GPS information, map data, IMU data, etc. In one approach, the vehicle 100 draws inferences using data from an aerial device (e.g., a drone, a UAV, etc.), activity estimators, dust estimators, predicted dust, incline estimators, etc. For example, the tracking system 170 estimates the activity as off-road since activity estimators detect bumpy roads, an incline maneuver, and dusty conditions. Furthermore, the activity estimators can estimate parameters relating to a declining path, encountering water, a jump by the vehicle 100, etc.

At 720, the identification module 220 on the vehicle 100 identifies shot-paths for the activity from estimated paths and viewing angles of the aerial device. Here, the identification module 220 may factor the context, the sensor data 250, and information acquired from the aerial device for identifying the shot-paths. In one approach, identification includes determining available, feasible, infeasible, safe, etc., flying paths for the aerial device to prevent damage and avoid accidents. Furthermore, feasibility computations can involve iteratively determining camera angles and positions that are possible along available flying paths for the aerial device. For instance, a shot-path is feasible when parameters and conditions indicate that the flight path is safe for the aerial device, the vehicle motion relative to the flight path has elevated excitement, the viewing is unobstructed (e.g., dust-free, lacking trees, etc.), and so on. Thus, the tracking system 170 computes shot-path feasibility and availability using context that includes vehicle safety, aerial device safety, view obstructions, and a relative motion.

At 730, the tracking system 170 calculates excitement factors for the shot-paths using a model and selects a shot-path(s) with excitement factors. Here, the model may be expert-based, data-driven, etc. An excitement factor may be a raw score formulated with changing camera angles, flying paths, DoF, vehicle views, shortest path, least cost, view confidence, etc. In one approach, a shot-path has an excitement factor that varies according to an excitement function that outputs a value (e.g., 1-10) associated with input quantities. For expert-based models, excitement factors weigh expert ratings of shot-paths. Experts can rate positions, angles, flying paths, plans, etc., by measuring and grading cinematographic qualities. For instance, a shot-path near a driver-side tire of the vehicle 100 during a drifting activity has an elevated excitement factor when the vehicle 100 is climbing a mountainous area. On the contrary, a shot-path 100 m above the vehicle 100 has a relatively depressed excitement factor for this activity involving the driver-side tire.

Regarding data-driven models, the tracking system 170 trains a model using operator habits (e.g., activity overrides, shot-path overrides, etc.), fleet data, environmental data, etc., and the model outputs predicted excitement factors during implementation. In various implementations, the tracking system 170 can rank the excitement of shot-paths by learning preferences acquired about vehicle occupants (e.g., passengers, operators, drivers, etc.) during operation. For example, the tracking system 170 learns positions, plans, etc., that the vehicle occupants previously selected for the aerial device while performing a particular activity and assigns elevated excitement ratings accordingly.

At 740, the tracking system 170 adapts the shot-path(s) for the activity by monitoring the situational data and factoring the excitement factors. As previously explained, in one embodiment, the tracking system 170 continuously replans a shot-path(s), a shot-paths timeline, etc., to maximize excitement. This may continue while the activity is constant and the shot-path(s) remain feasible. In one approach, the tracking system 170 estimates shot-path reuse and decay involving excitement factors associated with the shot-path(s), the shot-path(s) timeline, etc., for the replanning. In various implementations, the tracking system 170 identifies an initial shot-path having an excitement rate and excitement factor that are substantial and the aerial device follows the initial shot-path. The tracking system 170 subsequently commands the aerial device 350 to reposition after a time period and crossing a threshold for the excitement factor. Here, the threshold may represent a time point where the exciting path ceases being the most exciting through excitement decay, situational changes, occupant interest, etc. As such, the tracking system 170 can readjust the aerial device after the time period to ensure that excitement is kept elevated.

At 750, the tracking system 170 predicts whether the shot-path(s) satisfies the feasibility conditions for the activity. For example, feasibility changes due to safety for the vehicle 100 and the aerial device with the current shot-path(s) and activity. The tracking system 170 adapts the shot-path(s) at 740 while feasibility conditions are satisfied. Upon the shot-path(s) becoming infeasible, the tracking system 170 can recalculate excitement factors for shot-paths already identified and select a different shot-path at 730. As such, the tracking system 170 maintains exciting shot-paths and footage for the vehicle 100 through monitoring feasibility and adapting movement of the aerial device accordingly. In various implementations, the tracking system 170 selects another activity from a set of activities or exits cinematographic mode upon the activity for the vehicle terminating. For instance, an activity terminates when the operator overrides an activity, the tracking system 170 lacks exciting shot-paths, etc. Therefore, the tracking system 170 generates exciting and dramatic footage of the vehicle 100 with image data from an aerial device through shot-paths planning and maintains exciting footage by adapting the shot-paths, thereby increasing entertainment through optimizing excitement.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, programmable read-only memory (PROM), erasable programmable read-only memory (EPROM), electrically erasable programmable read-only memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an IMU, a dead-reckoning system, a global navigation satellite system (GNSS), a GPS, a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate to the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the tracking system 170, and/or the automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the movement of the vehicle 100. The processor(s) 110, the tracking system 170, and/or the automated driving module(s) 160 may control some or all of the vehicle systems 140 and, thus, may be partially or fully autonomous as defined by the society of automotive engineers (SAE) levels 0 to 5.

The processor(s) 110, the tracking system 170, and/or the automated driving module(s) 160 can be operatively connected to communicate with the various vehicle systems 140 and/or individual components thereof. For example, the processor(s) 110, the tracking system 170, and/or the automated driving module(s) 160 can be in communication to send and/or receive information from the various vehicle systems 140 to control the movement of the vehicle 100. The processor(s) 110, the tracking system 170, and/or the automated driving module(s) 160 may control some or all of the vehicle systems 140.

The processor(s) 110, the tracking system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the tracking system 170, and/or the automated driving module(s) 160 can control the direction and/or speed of the vehicle 100. The processor(s) 110, the tracking system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the tracking system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide arca network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A tracking system comprising:
- a memory storing instructions that, when executed by a processor, cause the processor to:
  - estimate an activity using context from situational data acquired about a vehicle and an environment surrounding the vehicle;
  - identify shot-paths for the activity from estimated paths and viewing angles of an aerial device;
  - calculate excitement factors for the shot-paths using a model and select at least one of the shot-paths according to the excitement factors;
  - on a condition that the at least one of the shot-paths satisfies feasibility conditions, a decay rate, and a decay duration, adapt the shot-paths for the activity by monitoring the situational data and factoring the excitement factors, and control the aerial device along the shot-paths, where in the decay rate and the decay duration include factoring interest from an occupant of the vehicle about an image from the at least one of the shot-paths; and
  - assemble a timeline for the vehicle with a sequence of the shot-paths according to the excitement factors, wherein the timeline repeats the at least one of the shot-paths that is an initial shot-path according to a downward slope of the decay rate and the decay duration for another one of the shot-paths.

2. The tracking system of claim 1 further including instructions to:
- optimize the timeline according to the decay rate and reuse factors associated with the shot-paths that maximize the excitement factors for the activity using a threshold level.

3. The tracking system of claim 2 further including instructions to:
- upon the at least one of the shot-paths unsatisfying the feasibility conditions associated with the decay rate, recalculate the excitement factors for the shot-paths using the model and select a different shot-path.

4. The tracking system of claim 2, wherein the instructions to calculate the excitement factors for the shot-paths further include instructions to:
- rank the excitement factors associated with the shot-paths by learning preferences acquired about occupants of the vehicle, wherein the preferences include one of occupant ratings for viewpoints, the viewing angles, flight plans for the activity, and a manual selection from the shot-paths.

5. The tracking system of claim 4, wherein the excitement factors are raw scores formulated with one of flight paths, the viewing angles, degrees of freedom (DoF), vehicle views, shortest path, least cost, and view confidence, and the model is one of an expert-based model and a data-driven model.

6. The tracking system of claim 1, wherein the instructions to identify the shot-paths further include instructions to:
- compute availability of the shot-paths using the context, wherein the shot-paths are available according to safety, view obstructions, and a relative motion between the vehicle and the aerial device.

7. The tracking system of claim 1, wherein the instructions to estimate the activity using the context further include instructions to:
- select the activity from a set of activities according to a trajectory and a speed of the vehicle.

8. The tracking system of claim 1 further including instructions to:
- upon the activity for the vehicle ending, search for another activity using the context.

9. The tracking system of claim 1, wherein the feasibility conditions include one of safety associated with the aerial device, a relative motion between the vehicle and the aerial device, and view obstructions.

10. A non-transitory computer-readable medium comprising:
- instructions that when executed by a processor cause the processor to:
  - estimate an activity using context from situational data acquired about a vehicle and an environment surrounding the vehicle;
  - identify shot-paths for the activity from estimated paths and viewing angles of an aerial device;
  - calculate excitement factors for the shot-paths using a model and select at least one of the shot-paths according to the excitement factors;
  - on a condition that the at least one of the shot-paths satisfies feasibility conditions, a decay rate, and a decay duration, adapt the shot-paths for the activity by monitoring the situational data and factoring the excitement factors, and control the aerial device along the shot-paths, wherein the decay rate and the decay duration include factoring interest from an occupant of the vehicle about an image from the at least one of the shot-paths; and
  - assemble a timeline for the vehicle with a sequence of the shot-paths according to the excitement factors, wherein the timeline repeats the at least one of the shot-paths that is an initial shot-path according to a downward slope of the decay rate and the decay duration for another one of the shot-paths.

11. A method comprising:

estimating an activity using context from situational data acquired about a vehicle and an environment surrounding the vehicle;

identifying shot-paths for the activity from estimated paths and viewing angles of an aerial device;

calculating excitement factors for the shot-paths using a model and selecting at least one of the shot-paths according to the excitement factors;

on a condition that the at least one of the shot-paths satisfies feasibility conditions, a decay rate, and a decay duration, adapting the shot-paths for the activity by monitoring the situational data and factoring the excitement factors, and controlling the aerial device along the shot-paths, wherein the decay rate and the decay duration include factoring interest from an occupant of the vehicle about an image from the at least one of the shot-paths; and assembling a timeline for the vehicle with a sequence of the shot-paths according to the excitement factors, wherein the timeline repeats the at least one of the shot-paths that is an initial shot-path according to a downward slope of the decay rate and the decay duration for another one of the shot-paths.

12. The method of claim 11 further comprising:

optimizing the timeline according to the decay rate and reuse factors associated with the shot-paths that maximize the excitement factors for the activity using a threshold level.

13. The method of claim 12 further comprising:

upon the at least one of the shot-paths unsatisfying the feasibility conditions associated with the decay rate, recalculating the excitement factors for the shot-paths using the model and selecting a different shot-path.

14. The method of claim 12, wherein calculating the excitement factors for the shot-paths further includes:

ranking the excitement factors associated with the shot-paths by learning preferences acquired about occupants of the vehicle, wherein the preferences include one of occupant ratings for viewpoints, the viewing angles, flight plans for the activity, and a manual selection from the shot-paths.

15. The method of claim 14, wherein the excitement factors are raw scores formulated with one of flight paths, the viewing angles, degrees of freedom (DoF), vehicle views, shortest path, least cost, and view confidence, and the model is one of an expert-based model and a data-driven model.

16. The method of claim 11, wherein identifying the shot-paths further includes:

computing availability of the shot-paths using the context, wherein the shot-paths are available according to safety, view obstructions, and a relative motion between the vehicle and the aerial device.

17. The method of claim 11, wherein estimating the activity using the context further includes:

selecting the activity from a set of activities according to a trajectory and a speed of the vehicle.

18. The method of claim 11 further comprising:

upon the activity for the vehicle ending, searching for another activity using the context.

19. The method of claim 11, wherein the feasibility conditions include one of safety associated with the aerial device, a relative motion between the vehicle and the aerial device, and view obstructions.

20. The method of claim 11, wherein the situational data includes information acquired from the aerial device about the vehicle and the environment surrounding the vehicle.

* * * * *